US006930956B2

(12) United States Patent
Mercier

(10) Patent No.: US 6,930,956 B2
(45) Date of Patent: Aug. 16, 2005

(54) CURRENT LOOP CONTROL CIRCUIT FOR A TIME OF FLIGHT RANGING SYSTEM

(75) Inventor: Claude Mercier, Peterborough (CA)

(73) Assignee: Siemens Milltronics Process Instruments, Inc., Ontario (CA)

(*) Notice: Subject to any disclaimer, the term of this patent is extended or adjusted under 35 U.S.C. 154(b) by 339 days.

(21) Appl. No.: 10/053,429

(22) Filed: Jan. 18, 2002

(65) Prior Publication Data

US 2003/0139146 A1 Jul. 24, 2003

(51) Int. Cl.[7] .............................................. G01S 15/00
(52) U.S. Cl. ...................................................... 367/99
(58) Field of Search ..................... 367/99, 908; 342/124

(56) References Cited

U.S. PATENT DOCUMENTS 5,416,723 A * 5/1995 Zyl ............................ 713/300
6,140,940 A 10/2000 Klofer et al. ........... 340/870.39

FOREIGN PATENT DOCUMENTS

CA 2416341 * 7/2003 ........... G08C/19/02

* cited by examiner

Primary Examiner—Daniel Pihulic
(74) Attorney, Agent, or Firm—Harness, Dickey & Pierce, P.L.C.

(57) ABSTRACT

A current loop control circuit for a process variable transmitter coupled to a receiver at a remote location through a two-conductor current loop. The current loop control circuit efficiently utilizes the current in the loop to produce an optimal voltage and current for the operation of the process variable measurement transmitter.

10 Claims, 3 Drawing Sheets

CURRENT LOOP CONTROL CIRCUIT FOR A TIME OF FLIGHT RANGING SYSTEM

FIELD OF THE INVENTION

The present invention relates to time of flight ranging systems, and more particularly to a two-conductor current loop control circuit for powering a time of flight ranging system.

BACKGROUND OF THE INVENTION

Time of flight ranging systems, are commonly used in level measurement applications, and referred to as level measurement systems. Level measurement systems determine the distance to a reflector (i.e. reflective surface) by measuring how long after transmission of a burst of energy pulses, an echo is received. Such systems typically utilize ultrasonic pulses, pulse radar signals, or microwave energy signals.

Time of flight ranging systems are commonly utilized in remote locations where process variable data is transmitted to a central location for further processing or collection. A common means for transmitting such data is by a current loop. The value of the process variable is represented by the magnitude of a current passing through the loop, with the magnitude lying between predetermined minimum and maximum values, typically 4 mA and 20 mA. Such a current loop has a high degree of noise immunity and has gained widespread industrial acceptance.

In time of flight systems, the transmitter usually has electrical power requirements of its own, and it is often convenient to meet these power requirements from the current passing in the loop. A limitation of such loop powered transmitters has been that they must be able to operate at the minimum level of loop current, typically 4 mA. In recent years, a number of "smart" or "intelligent" transmitters have been developed, which utilize microprocessors or microcontrollers to control sensing or measurement of the process variable, and conversions of the data generated into an appropriate current level in the loop.

U.S. Pat. No. 5,416,723 which is issued on May 16, 1995 to the common assignee of the subject application disclosed such a "loop powered two wire intelligent process variable transmitter". The loop powered intelligent transmitter includes a microprocessor, a memory for storing a program for execution by the microprocessor, circuit elements for measuring a process variable under control of the microprocessor in accordance with the stored program, a current control circuit controlled by the microprocessor and for determining amplitude of a current passing in a current loop between maximum and minimum finite values in a predetermined relationship to a measured value of the process variable, and a power regulating circuit providing power at a controlled potential required by the microprocessor and the measuring circuit elements. According to the invention, the regulating circuit is associated with a circuit configured to sense a deficit in its capability to supply the integrated power requirements of the microprocessor and measuring circuit elements, and to delay the execution of the stored program sufficiently in response to the sensing of such a deficit to reduce the integrated power requirements to overcome the deficit. According to one arrangement, a microprocessor is utilized which has, in addition to its normal operating mode, a low power consumption "sleep" mode in which program execution is halted. A power deficit results in halting the program execution, and hence of measurement processes controlled by the microprocessor, until the deficit is made up, such that the program executes intermittently, the extent of the intermittence depending on the extent to which the normal operating power requirement exceeds the available power. In an alternative arrangement, a microprocessor is utilized of a type whose power consumption is proportional to its clock rate, e.g. most CMOS microprocessors, and which can operate satisfactorily over a wide range of clock rates, and the clock rate is reduced from a normal maximum value in response to a power deficit condition. The first arrangement is preferable where certain operation controlled by the microprocessor must be carried out in real time.

The arrangement disclosed in U.S. Pat. No. 5,416,723 is effective in storing energy for future use by the microprocessor and circuitry, for example, when there is less power available from the current loop then required for the circuitry, and allows the power from the current loop to exploited more effectively. However, in situations where the current loop provides more power then is required by the circuitry, the excess power is dissipated as heat. It will be appreciated that it is advantageous to utilize this extra capacity in a form other than just dissipation as heat. Accordingly, the present invention provides a circuit arrangement for more efficiently utilizing the excess power which may be available from the current loop.

BRIEF SUMMARY OF THE INVENTION

The present invention provides a current controller suitable for use with a process variable measurement transmitter operating with a remote receiver on a current loop. The current controller comprises a circuit that efficiently utilizes the current in the loop to produce an optimal voltage and current for the process variable measurement transmitter.

In a first aspect, the present invention provides a current control circuit for a process variable transmitter, the process variable transmitter is coupled to a receiver at a remote location through a two-conductor loop carrying a current signal, and the two-conductor loop provides a signal path and a supply current at a supply voltage for the process variable transmitter, said current control circuit comprising: (a) an input port having first and second terminals for connecting to respective conductors of the two-conductor loop, and said input port receiving the current signal from the two-conductor loop; (b) an output port for coupling to a process variable measurement device for measuring a process variable, said output port providing said process variable measurement device with a power supply derived from the current signal in the two-conductor loop, and said process variable measurement device generating an output corresponding to the process variable being measured; (c) a current controller having a current source for setting a current signal level in the two-conductor loop, and said current signal level being a function of the state of the process variable output and said current signal level serving to transmit the process variable output to the remote receiver; (d) an adjustable current controller having an input coupled to said input port for receiving the current signal from the two conductor loop, and an output coupled to said current source, and said adjustable current controller including a control input for adjusting the level of the current signal received from the two-conductor loop; (e) a control component coupled to the control input of said adjustable current controller, said control component being responsive to the supply current being used by the process variable measurement device, and said control component generating a control output for said adjustable current controller to adjust the received current signal to a level to provide an optimal voltage level for the process variable measurement device.

In a further aspect, the present invention provides a time of flight ranging system coupled to a receiver at a remote location through a two-conductor loop carrying a current signal, and the two-conductor loop providing a signal path and a supply current at a supply voltage for the time of flight ranging system to transmit measurements to the a remote receiver, the time of flight ranging system comprises: (a) a process variable measurement stage having, a transducer for emitting energy pulses and coupling reflected energy pulses; a controller having a receiver stage and a transmitter stage; the transducer having an input port operatively coupled to the transmitter stage and being responsive to the transmitter stage for emitting the energy pulses, and the transducer includes an output port operatively coupled to the receiver component for outputting reflected energy pulses coupled by the transducer; the receiver stage converts the reflected energy pulses into corresponding electrical signals for output to the controller, and the controller includes a program component for processing the electrical signals and generating measurement readings; (b) a current control circuit including, an input port having first and second terminals for connecting to respective conductors of the two-conductor loop, and the input port receives the current signal from the two-conductor loop; an output port for coupling to a process variable measurement component for measuring a process variable, the output port provides the process variable measurement component with a power supply derived from the current signal in the two-conductor loop, and the process variable measurement component generates an output corresponding to the process variable being measured; a current controller having a current source for outputting a current signal level in the two-conductor loop, and the current signal level is a function of the state of the process variable output and the current signal level serves to transmit the process variable output to the remote receiver; an adjustable current controller having an input coupled to the input port for receiving the current signal from the two-conductor loop, and an output coupled to the current source, and the adjustable current controller includes a control input for adjusting the level of the current signal received from the two-conductor loop and passed to the current source; a control component coupled to the control input of the adjustable current controller, the control component is responsive to the supply current being used by the process Variable measurement device, and the control component generates a control output for the adjustable current controller to adjust the received current signal to a level to provide an optimal voltage level for the process variable measurement device.

In yet another aspect, the present invention provides a pulse-echo acoustic ranging system coupled to a receiver at a remote location through a two-conductor loop carrying a current signal, and the two-conductor loop provides a signal path and a supply current at a supply voltage for the pulse echo acoustic ranging system to transmit measurements to the remote receiver, the pulse echo acoustic ranging system comprises:

(a) a process variable measurement stage has a transducer for emitting acoustic pulses and coupling reflected acoustic pulses; a controller has a receiver stage and a transmitter stage, the transducer has an input port operatively coupled to the transmitter stage and being responsive to the transmitter stage for emitting said acoustic pulses, and the transducer includes an output port operatively coupled to the receiver component for outputting reflected acoustic pulses coupled by the transducer, the receiver stage converts the reflected acoustic pulses into corresponding electrical signals for output to the controller, and the controller includes a program component for processing the electrical signals and generating measurement readings;

(b) a current control circuit having an input port with first and second terminals for connecting to respective conductors of the two-conductor loop, and the input port receives the current signal from the two-conductor loop; an output port for coupling to a process variable measurement component for measuring a process variable, the output port provides the process variable measurement component with a power supply derived from the current signal in the two-conductor loop, and the process variable measurement component generates an output corresponding to the process variable being measured; a current controller having a current source for outputting a current signal level in the two-conductor loop, and the current signal level is a function of the state of the process variable output and the current signal level serves to transmit the process variable output to the remote receiver; an adjustable current controller having an input coupled to the input port for receiving the current signal from the two-conductor loop, and an output coupled to the current source, and the adjustable current controller includes a control input for adjusting the level of the current signal received from the two conductor loop and passed to the current source; a control component coupled to the control input of the adjustable current controller, the control component being responsive to the supply current being used by the process variable measurement device, and the control component generates a control output for the adjustable current controller to adjust the received current signal to a level to provide an optimal voltage level for the process variable measurement device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made to the accompanying drawings, which show, by way of example, preferred embodiments of the present invention, and in which.

DETAILED DESCRIPTION OF THE PREFERRED EMBODIMENT

Figure 1:
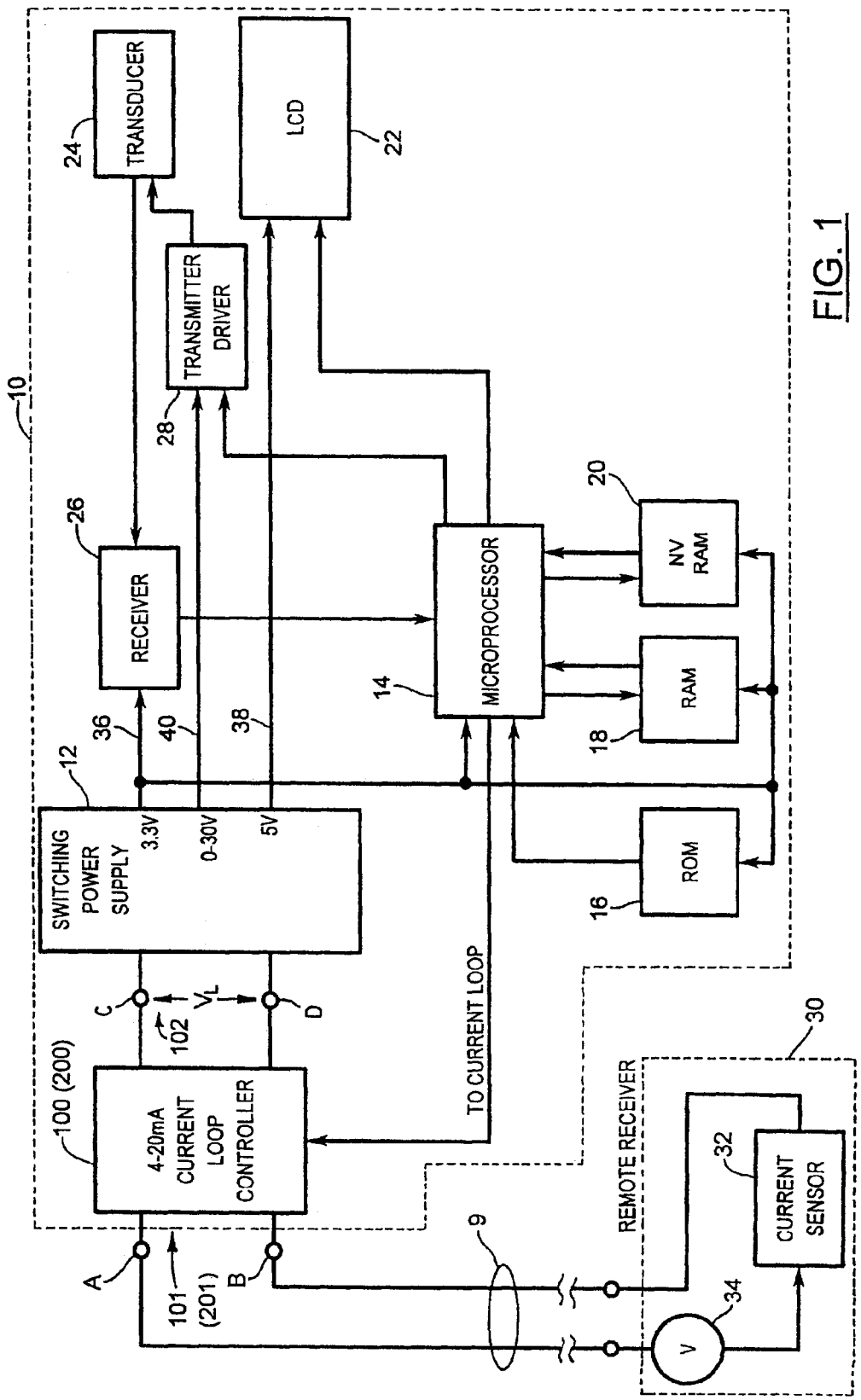
FIG. 1 shows in diagrammatic form a loop powered time of flight ranging system with a current loop control circuit according to the present invention.

Reference is first made to FIG. 1, which shows in diagrammatic form a pulse echo ranging device 10 incorporating a 4–20 mA current loop control circuit or controller 100 according to the present invention. While the present invention is described in the context of time of flight ranging systems, and more specifically an ultrasound pulse echo system, it will be appreciated that the present invention has wider applicability to other types of time of flight ranging systems, such as radar or microwave based systems, and other types of process variable measurement devices, operating on a current loop.

The pulse echo ranging device 10 comprises a power supply 12, and a microprocessor 14. The microprocessor 12 is associated with a read only memory (ROM) 16 for storing a control program for the microprocessor 14, a random access memory (RAM) 18 providing scratch pad memory and temporary storage of variables, and a non-volatile memory 20 for storing operating parameters under power-down conditions. The device 10 preferably includes a display module 22, for example, a liquid crystal display or LCD. The LCD 22 is controlled by the microprocessor 14 and provides a user with operational parameters and other information on the device 10.

The microprocessor 14 is preferably fabricated using low power semiconductor devices, for example, CMOS technology, and provides a "sleep" mode during which its internal clocks stop and the microprocessor 14 ceases execution of instructions while preserving all of its internal registers until such time as it receives a "wake up" signal.

The pulse echo ranging device 10 also includes a transducer 24 which is coupled to a receiver 26 and a transmitter driver 28. The transducer 24 may comprise, for example, a piezoelectric transducer which generates ultrasonic pulses. The ultrasonic acoustic energy is reflected by a target surface whose range is to be determined back to the transducer 24 as an echo. The return energy picked up by the transducer 24 is applied to the input of the receiver 26. The received signal is gain controlled and logarithmically amplified in the receiver 26 before being sampled and digitized for processing by the microprocessor 14 to identify and verify the echo and calculate the range of the target surface using known techniques.

As also shown in FIG. 1, the pulse echo ranging device 10 includes a 4–20 mA current loop control circuit 100. The 4–20 mA current loop control circuit 100 includes an input port 101 having terminals A and B which couple to two conductors in a current loop 9. The pulse echo ranging device 10 transmits the process variable data (e.g. measurements) to a remote receiver 30 (FIG. 1) via the current loop 9.

Digital data representing a desired loop current, in turn, representing the measured range of the target surface is output from the microprocessor 14 to the 4–20 mA current loop control circuit 100. One of the functions of the loop control circuit 100 is to translate the digital information into analogue form (as a function of the processed output of the transducer 24) and regulate the current through the current loop 9 between terminals A and B. As shown in FIG. 1, the current loop 9 is coupled to a remote receiver current sensor 32 (FIG. 1) which is connected in series with a voltage power supply 34 (FIG. 1) in the remote receiver 30. For example, if the digital signal has a high value, then a high level current signal is generated for the current loop 9; conversely, if the digital signal is a low value, a low-level current signal is generated for the current loop 9.

Referring to FIG. 1, the 4–20 mA current loop control circuit 100 has an output port 102 having terminals C and D. The output port 102 couples to the input of the power supply 12. The power supply 12 comprises a switching power supply (not shown) and has a first voltage output 36, a second voltage output 38, and a third voltage output 40. The first voltage output 36 provides a 3.3 Volt supply for powering the microprocessor 14, the ROM 16, the RAM 18 and the NV RAM 20. The first voltage output 36 also powers the electronic circuitry for the receiver 26. The second voltage output 38 provides a 5 Volt supply for powering the LCD module 22. The third voltage output 40 provides a 0–30 Volt supply for powering the transducer 24.

Figure 2:
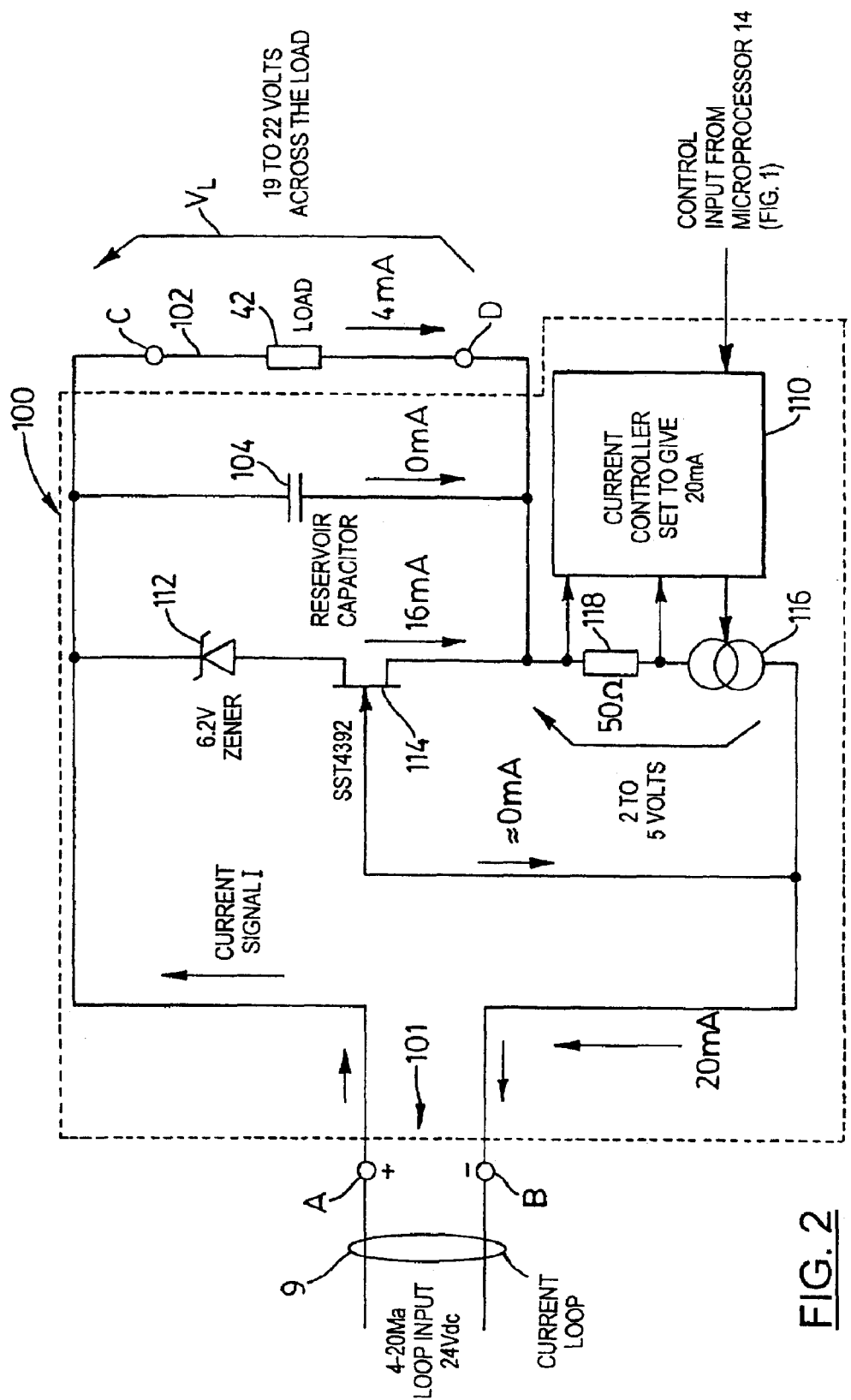
FIG. 2 shows in schematic form one embodiment of the current loop control circuit according to the present invention.

Reference is next made to FIG. 2 which shows in more detail a 4–20 mA current loop control circuit 100 according to a first embodiment of the present invention. The current loop 9 is capable of supplying between 4 to 20 mA from 12 VDC to 30 VDC to the circuitry in the pulse echo ranging device 10. (In a typical application, the current is supplied at 24 VDC.) As will be described in more detail below, the circuit 100 insures that 20 mA is supplied from the current loop 9 and the voltage to the pulse echo ranging device 10 (i.e. the load) is optimized. For example in a conventional device, if the current loop 9 provides 20 mA, but the circuit only requires 4 mA, then the excess energy would otherwise be dissipated in the circuitry of the pulse echo ranging device 10 as heat. Through the operation of the current loop control circuit 100, the excess current is utilized to provide a higher voltage supply to the pulse echo ranging device 10 which means that more energy can be stored locally in a capacitor which acts as a reservoir as described below, and the higher voltage level also allows the pulse echo ranging device 10 to operate at faster speeds, for example, for data refresh operations. The circuit elements for the device 10, i.e. the power supply 12, the microprocessor 14, ROM 16, RAM 18, NV ROM 20, the LCD 22, the transducer 24, the receiver 26, and the transmitter driver 28, are represented generally by a load resistor 42. The load resistor 42 is shown coupled across the terminals C and D of the output port 102.

As shown in FIG. 2, the 4–20 mA current loop control circuit 100 comprises a current controller 110, together with a Zener diode 112, a variable current controller 114, a current source 116, and a sensing circuit 118. The current controller 110 controls the current flowing in the current loop 9 between the pulse echo ranging device 10 (FIG. 1) and the remote receiver 30 (FIG. 1), in particular, the translation of the digital signals into respective analogue current signals as function of the logical states of the digital signals. The cathode of the Zener diode 112 is coupled to terminal A of the input port 101 in the current loop 9, and the anode of the diode 112 is connected to the variable current controller 114. The variable current controller 114 controls the current flow through the Zener diode 112. The sensing circuit 118 has one terminal connected to the output of the variable current controller 114 and another terminal connected to the current source 116. Current flow through the Zener diode 112 is automatically adjusted so that a voltage of about 1.0 VDC is maintained across the series connected sensing circuit 118 and the current source 116. The current controller 110 uses the sensing circuit 118 to adjust the voltage drop across the current source 116 and the variable current controller 114 is used to control the current through the Zener diode 112.

As shown in FIG. 2, a reservoir capacitor 104 is connected in parallel with the load resistor 42 (i.e. the circuitry for the pulse echo ranging device 10). In operation, when the pulse echo ranging device 10 is first connected to the current loop 9, a current of 20 mA is applied, i.e. assuming the loop 9 is supplying at 20 mA, and the voltage across the capacitor 104 is 0 volts. If the current loop 9 is operating at 24 VDC, then there will be a voltage of 24 VDC across the sensing circuit 118 and the current source 116. After a short period of time, the reservoir capacitor 104 is charged. For the embodiment shown in FIG. 2, the variable current controller 114 is implemented using a JFET (Junction Field Effect Transistor) and regulates the current to control the voltage drop across the series-connected current source 116 and the sensing circuit 118. The gate of the JFET 114 is connected to the current source 116 and the voltage applied to the gate of the JFET 114 controls the flow of current through the JFET 114. In this way, if the load 42 (i.e. the circuitry for the pulse echo ranging device 10) only takes the required current, e.g., 4 mA, the remainder of the current supplied by the loop, e.g. 16 mA, flows through branch with the Zener diode 112 and is dissipated as heat. If the load 42, i.e. the circuitry for the device 10, requires 12 mA and the current loop 9 supplies 20 mA, then the change in voltage across the sensing circuit 118 results in a change to the voltage applied to the gate of the JFET of the variable current controller 114 causing the remainder of the current, i.e. 8 mA, to flow through the Zener diode 112 and back into the current loop 9, thereby maintaining the current in the loop 9 at the higher level, e.g. 20 mA.

Referring still to FIG. 2, the current source 116 may be implemented using a MOSFET transistor configured in a common source mode, and the sensing circuit 118 is implemented using a 50-Ohm resistor. This means that the drop across the MOSFET transistor for the current source 116 is approximately 0.2 VDC (depending of the kind of MOSFET transistor used) and with a current of 25 mA (during the start-up) the voltage drop across the resistor for the sensing circuit 118 is 1.25 VDC giving a total voltage drop of 1.45 VDC. Accordingly, a gate voltage of at least 2.0 VDC is applied to the JFET 114 to maintain the current flow through the series connected sensing circuit 118 and the current source 116.

While the circuit arrangement depicted in FIG. 2 for the current loop control circuit 100 is effective, the JFET for the variable current controller 114 makes it difficult to achieve very precise control. In particular it is difficult to precisely control the voltage threshold on the gate of the JFET 114. Where the preferred voltage threshold for the gate is about −2.0 VDC, the gate threshold voltage for actual JFETs can vary from −2 to −5 Volts from batch to batch. This makes it difficult to achieve a precise gate voltage threshold which is required to minimize the power loss in the current limiting device 116.

Figure 3:
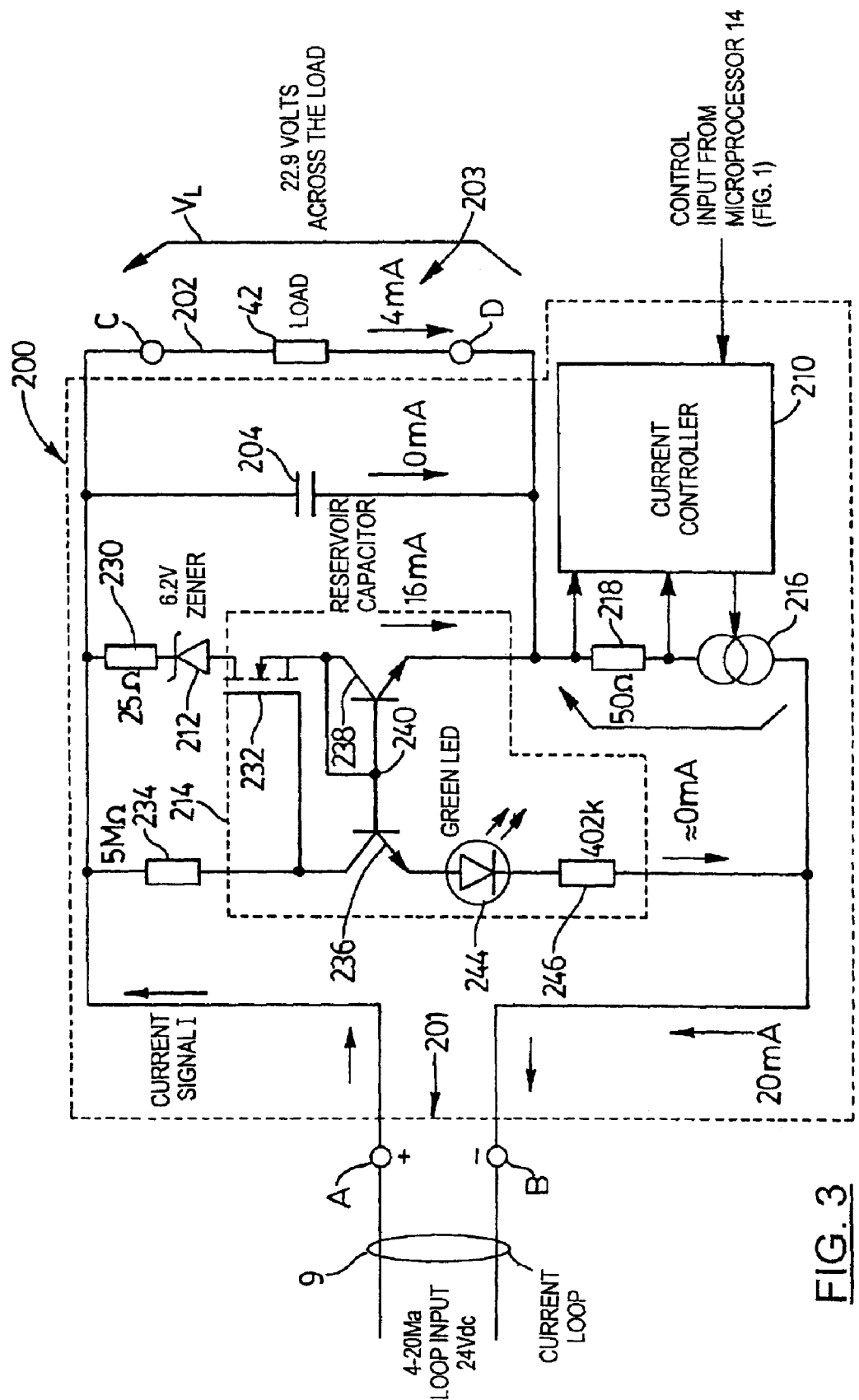
FIG. 3 shows in schematic form another embodiment of the current loop control circuit according to the present invention.

Reference is next made to FIG. 3, which shows a 4–20 mA current loop control circuit 200 according to another embodiment of the present invention.

The current loop control circuit 200 provides a gate voltage threshold of about 2.0 VDC which is compensated over the temperature range −40° C. to +85° C., as will be described in more detail below.

As shown in FIG. 3, the 4–20 mA current loop control circuit 200 comprises a current controller 210, a resistor 230, a Zener diode 212, a variable current controller 214, a sensing circuit 218 and a current source 216. The circuitry for the pulse echo ranging device 10, i.e. the microprocessor 14, ROM 16, RAM 18, NV ROM 20, the receiver 26, and the transmitter driver 28, are represented generally by a load resistor 42 (as described above for FIG. 2). In addition, a reservoir capacitor 204 is included. The function of the reservoir capacitor 204 is to store energy available from the current loop 9, but not presently required by the load 42, for future use in the pulse echo ranging device 10.

As will be described in more detail, the current loop control circuit 200 controls the current supplied by the current loop 9 to maximize the differential voltage available on the current loop 9. It will be appreciated that a higher voltage supplied to the pulse echo ranging device 10 means more energy can be stored for power down periods and the higher voltage also provides a higher speed for data refresh.

In this embodiment, the current controller 210 is configured for the circuit 200 to receive 20 mA from the current loop 9, and through the operation of the circuit 200 provide a voltage level of 22.0 volts across the load 42 (i.e. circuitry for the device 10) as will be described in more detail below. The threshold voltage of 2.0 VDC is selected in order to maintain a 1.25 VDC voltage (which occurs when there is 25 mA in the loop during a power up) drop across the sensing circuit 218 and about 0.75 VDC across the current source 216 (to operate in the linear region of the MOSFET transistor used to make the current source 216).

The variable current controller 214 provides an equivalent circuit to the JFET 114 of FIG. 2. As shown in FIG. 3, the equivalent circuit 214 comprises a MOSFET transistor 232 coupled to the anode of the Zener diode 212. The cathode of Zener diode 212 is coupled to a stabilizing resistor 230 which is connected to the terminal A of the input port 101. The gate of the MOSFET transistor 232 is connected to the collector of a Bipolar Junction Transistor or BJT 236. The collector of the transistor 236 is also connected to one terminal of a resistor 234. The other terminal of the resistor 234 is connected to terminal A of the input port 101. A second Bipolar Junction Transistor 238 is coupled to form a diode equivalent circuit by connecting the base and the collector together. The base of the BJT 236 is connected to the base of the second BJT 238. The collector of the BJT 238 is connected to the source of the MOSFET 232. The emitter of the BJT 238 is connected to the sensing resistor 218. The emitter of the BJT 236 is connected to the anode of a green LED (Light Emitting Diode) 244. The cathode of the LED 244 is then connected to a resistor 246. The other side of the same resistor 246 is then connected to terminal B of the input port 101.

Referring to FIG. 3, the LED 244 comprises a green LED which has a diode forward voltage or drop voltage of 1.5 VDC with a bias current of 1 $\mu$A or less. Furthermore, the coefficient for the change over temperature of the forward or drop voltage for a green LED is approximately −2.7 mV/° C. The difference between the emitter of BJT 238 and terminal B of the input port 101 will be around 2.0 Volt (assuming a 0.5V drop across the resistor 246). Any temperature variation will affect the voltage drop across the LED 244, but it will be insignificant compared to the voltage variance arising from a JFET transistor implementation as in FIG. 2. Accordingly, that the green LED 244 advantageously provides a predictable and stable drop voltage.

In the operation of the current loop 9 to transmit process variable measurement information, the microprocessor 14 (FIG. 1) converts digital data representing the range of the target surface (i.e. process measurement variables) into an analogue form suitable for transmission on the current loop 9. Under the control of the microprocessor 14 the current flowing through the current loop 9, i.e. between terminals A and B of the input port 101 is regulated through the operation of the current controller 110 (FIG. 2), or the current controller 210 for the embodiment of FIG. 3, to transmit the process variable information to the remote receiver 30 (FIG. 1). As described, the remote receiver 30 includes the current sensor 32 (as also shown in FIG. 1) which senses the changes in the current flowing in the current loop 9 and these detected changes are converted into corresponding voltage signals for further processing at the remote receiver 30.

The present invention may be embodied in other specific forms without departing from the spirit or essential characteristics thereof. Certain adaptations and modifications of the invention will be obvious to those skilled in the art.

Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A time of flight ranging system coupled to a receiver at a remote location through a two-conductor loop carrying a current signal, and the two-conductor loop providing a signal path and a supply current at a supply voltage for the time of flight ranging system to transmit measurements to the remote receiver, said time of flight ranging system comprising:
   (a) a process variable measurement stage comprising,
      a transducer for emitting energy pulses and coupling reflected energy pulses;
      a controller having a receiver stage and a transmitter stage;
      said transducer having an input port operatively coupled to said transmitter stage and being responsive to said transmitter stage for emitting said energy pulses, and said transducer including an output port operatively coupled to said receiver component for outputting reflected energy pulses coupled by said transducer;
      said receiver stage converting said reflected energy pulses into corresponding electrical signals for output to said controller, and said controller including a program component for processing said electrical signals and generating measurement readings;
   (b) a current control circuit comprising,
      an input port having first and second terminals for connecting to respective conductors of the two-conductor loop, and said input port receiving the current signal from the two-conductor loop;
      an output port for coupling to a process variable measurement component for measuring a process variable, said output port providing said process variable measurement component with a power supply derived from the current signal in the two-conductor loop, and said process variable measurement component generating an output corresponding to the process variable being measured;
      a current controller having a current source for outputting a current signal level in the two-conductor loop, and said current signal level being a function of the state of the process variable output and said current signal level serving to transmit the process variable output to the remote receiver;
      an adjustable current controller having an input coupled to said input port for receiving the current signal from the two-conductor loop, and an output coupled to said current source, and said adjustable current controller including a control input for adjusting the level of the current signal received from the two-conductor loop and passed to said current source;
      a control component coupled to the control input of said adjustable current controller, said control component being responsive to the supply current being used by the process variable measurement device, and said control component generating a control output for said adjustable current controller to adjust the received current signal to a level to provide an optimal voltage level for the process variable measurement device.

2. The time of flight ranging system as claimed in claim 1, further including a reservoir capacitor coupled to said input port for receiving current at the supply voltage from said two-conductor loop and storing energy as a function of the received current and the supply voltage level.

3. A pulse-echo acoustic ranging system coupled to a receiver at a remote location through a two-conductor loop carrying a current signal, and the two-conductor loop providing a signal path and a supply current at a supply voltage for the pulse-echo acoustic ranging system to transmit measurements to the remote receiver, said pulse echo acoustic ranging system comprising:
   (a) a process variable measurement stage comprising,
      a transducer for emitting acoustic pulses and coupling reflected acoustic pulses;
      a controller having a receiver stage and a transmitter stage; said transducer having an input port operatively coupled to said transmitter stage and being responsive to said transmitter stage for emitting said acoustic pulses, and said transducer including an output port operatively coupled to said receiver component for outputting reflected acoustic pulses coupled by said transducer; said receiver stage converting said reflected acoustic pulses into corresponding electrical signals for output to said controller, and said controller including a program component for processing said electrical signals and generating measurement readings;
   (b) a current control circuit comprising,
      an input port having first and second terminals for connecting to respective conductors of the two-conductor loop, and said input port receiving the current signal from the two-conductor loop; an output port for coupling to a process variable measurement component for measuring a process variable, said output port providing said process variable measurement component with a power supply derived from the current signal in the two-conductor loop, and said process variable measurement component generating an output corresponding to the process variable being measured;
      a current controller having a current source for outputting a current signal level in the two-conductor loop, and said current signal level being a function of the state of the process variable output and said current signal level serving to transmit the process variable output to the remote receiver; an adjustable current controller having an input coupled to said input port for receiving the current signal from the two-conductor loop, and an output coupled to said current source, and said adjustable current controller including a control input for adjusting the level of the current signal received from the two-conductor loop and passed to said current source; a control component coupled to the control input of said adjustable current controller, said control component being responsive to the supply current being used by the process variable measurement device, and said control component generating a control output for said adjustable current controller to adjust the received current signal to a level to provide an optimal voltage level for the process variable measurement device.

4. The pulse-echo acoustic ranging system as claimed in claim 3, further including a reservoir capacitor coupled to said input port for receiving current at the supply voltage from said two-conductor loop and storing energy as a function of the received current and the supply voltage level.

5. The current control circuit as claimed in claim 4, wherein said adjustable current controller comprises a Junction Field Effect Transistor having a source, drain, and gate, said source providing said input and being coupled to said input port, said drain providing said output and being coupled to said current source, and said gate providing said control input and being responsive to said control output for changing the channel in said Junction Field Effect Transistor and varying the current signal passed to said current source.

6. The current control circuit as claimed in claim 5, wherein said control signal comprises a voltage level applied to said gate, and said voltage level being derived from a sensing circuit, said sensing circuit having a component for sensing the output from said current source.

7. The current control circuit as claimed in claim 4, wherein said adjustable current controller comprises an equivalent circuit for a Junction Field Effect Transistor, said equivalent circuit having a first terminal for said input and being coupled to said current source, a second terminal for said output and being coupled to said current source, and a third terminal for said control input, and said third terminal being coupled to a sensing circuit having a component for sensing the output from said current source and generating a voltage level for said control input to control the current signal to said current source.

8. The current control circuit as claimed in claim 7, wherein said equivalent circuit includes a diode for generating a predetermined and stable drop voltage, said drop voltage having a known temperature variance characteristic.

9. The current control circuit as claimed in claim 4, wherein said adjustable current controller comprises first and second BJT transistors, a MOSFET transistor, a Zener diode having an anode and a cathode, a diode having an anode and a cathode, said first and second BJT transistors each having an emitter, a collector, and a base, said MOSFET transistor having a source, drain, and gate, and drain of said MOSFET being connected to the anode of said Zener diode, the cathode of said Zener diode being connected to one terminal of a first resistor and the other terminal of said first resistor being connected to the first terminal of said input port, the gate of said MOSFET transistor being connected to the first terminal of said input port through a second resistor, and the gate of said MOSFET transistor being connected to the collector of said first BJT transistor, the base of said first BJT transistor being connected to the base of said second BJT transistor, and the base and collector of said second BJT transistor being connected together as a diode to compensate the voltage drop and temperature variation of said first BJT transistor, and the base of said second BJT transistor being connected to the source of said MOSFET transistor, and the emitter of said second BJT transistor being connected to a third resistor for sensing current in the loop, and the emitter of said first BJT transistor being connected to the anode of a Light Emitting Diode, said Light Emitting Diode providing a predictable and stable voltage drop in a forward biased state with a bias current.

10. The current control circuit as claimed in claim 9, wherein said Light Emitting Diode has a drop voltage of approximately 1.5 VDC and a bias current less than 1 $\mu$A, and further including another resistor connected in series with said LED to provide a total voltage drop of approximately 2.0 VDC.

* * * * *